| CONDITION | ITEMS | | | |
|---|---|---|---|---|
| | AMP1 | AMP2 | SV1 | SV2 |
| 1 | 20 | 20 | 20 | 20 |
| 2 | X | 40 | 20 | 20 |
| 3 | 40 | X | 20 | 20 |
| 4 | 10 | 10 | X | 20 |
| 5 | 10 | 10 | 20 | X |
| 6 | X | 20 | X | 20 |
| 7 | X | 20 | 20 | X |
| 8 | 20 | X | X | 20 |
| 9 | 20 | X | 20 | X |

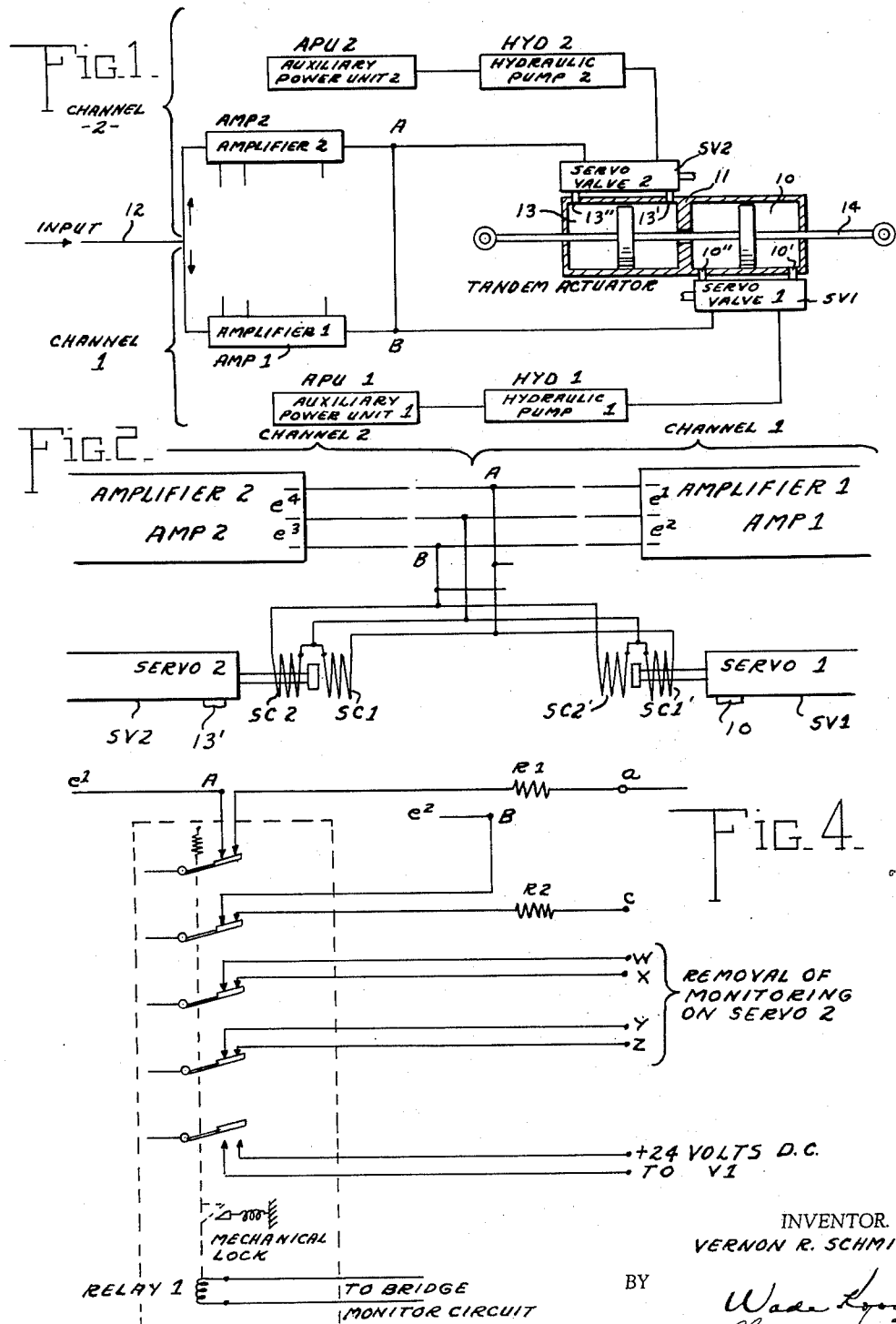

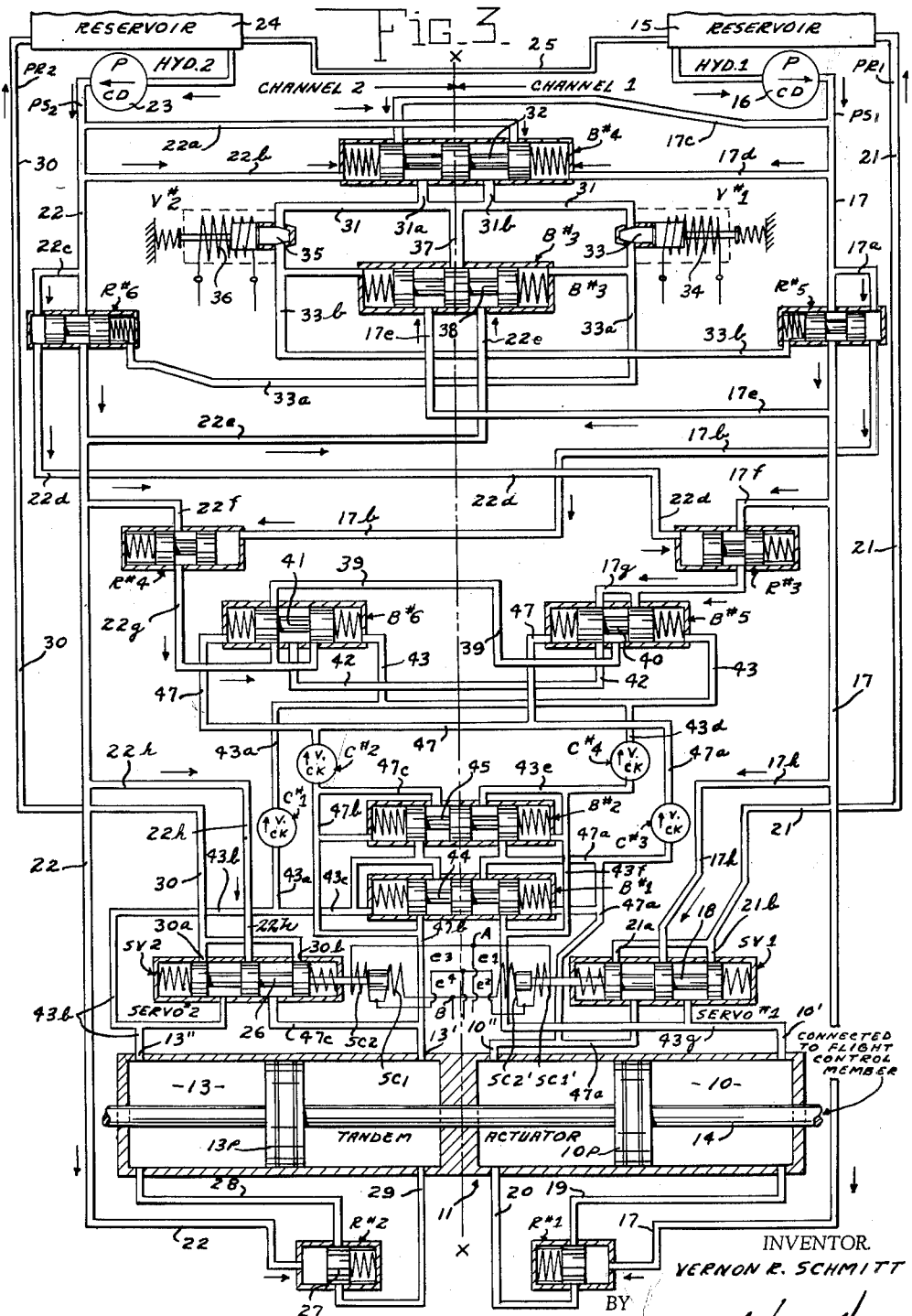

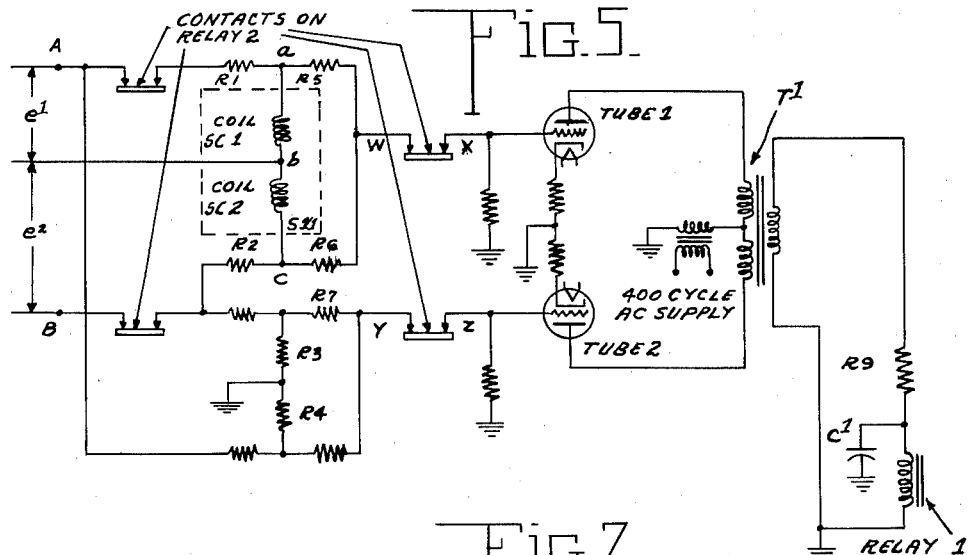

KEY: 1. X DENOTES FAILURE OF ITEM
2. NUMBERS INDICATE THE CURRENT, IN MILLIAMPERES EITHER BEING DELIVERED OR USED BY THE OPERABLE ITEM

Fig. 7.

| CONDITION | ITEMS | | | | | |
|---|---|---|---|---|---|---|
| | S1 | S2 | A1 | A2 | HYD1 | HYD2 |
| 1 | X | O | O | O | O | O |
| 2 | O | X | O | O | O | O |
| 3 | O | O | X | O | O | O |
| 4 | O | O | O | X | O | O |
| 5 | O | O | O | O | X | O |
| 6 | O | O | O | O | O | X |
| 7 | X | O | X | O | O | O |
| 8 | X | O | O | X | O | O |
| 9 | O | X | X | O | O | O |
| 10 | O | X | O | X | O | O |
| 11 | X | O | O | O | X | O |
| 12 | X | O | O | O | O | X |
| 13 | O | X | O | O | X | O |
| 14 | O | X | O | O | O | X |
| 15 | O | O | X | O | O | X |
| 16 | O | O | X | O | X | O |
| 17 | O | O | O | X | X | O |
| 18 | O | O | O | X | O | X |
| 19 | X | O | X | O | X | O |
| 20 | X | O | X | O | O | X |
| 21 | X | O | O | X | X | O |
| 22 | X | O | O | X | O | X |
| 23 | O | X | O | X | X | O |
| 24 | O | X | O | X | O | X |
| 25 | O | X | X | O | X | O |
| 26 | O | X | X | O | O | X |

KEY: O DENOTES OPERABLE ITEM.
X DENOTES ITEM HAS FAILED

INVENTOR.
VERNON R. SCHMITT
BY
ATTORNEYS

United States Patent Office 3,120,787
Patented Feb. 11, 1964

3,120,787
DUAL FLIGHT CONTROL SYSTEM
Vernon R. Schmitt, Grove City, Ohio, assignor to the United States of America as represented by the Secretary of the Air Force
Filed Jan. 11, 1963, Ser. No. 250,967
15 Claims. (Cl. 91—28)
(Granted under Title 35, U.S. Code (1952), sec. 266)

This invention relates to servo-actuated dual control systems and, more particularly, to servo-actuated dual flight control systems for aircraft, which comprises means for cross feeding the control functions in the servo-actuated systems of the dual flight control types for automatically switching the control functions between the two channels of the system, so that as long as one unlike component in each channel is operating regardless of the channel in which the component or components are located, the control system remains operative to provide increased overall reliability of the system.

An object of the invention, therefore, is the provision of a dual or two separate channel control system for normally simultaneously operating a tandem actuator for actuating a flight attitude control element of an aircraft, in which the failure of one or more of the control components in one channel of the system automatically removes the control features of the failed element from the channel or transfers the functions thereof to the similar control element in the other channel.

A further object of the invention is the provision of a hydraulically operated dual flight control system comprising two separate hydraulically operated channels each connected individually to operate a tandem actuator for actuation of a movable control member, in which the failure of one hydraulic system automatically connects the other hydraulic system to both actuating elements of the tandem actuator elements, whereby the hydraulic force of one channel is operable to actuate both hydraulically operated elements of the tandem actuator, to apply the same actuating pressure to the flight control member as when both hydraulically operated channels were functioning.

A further object includes a servo control valve in each hydraulic channel for controlling the direction of actuation of the tandem actuator, for the control member in each chamber of the tandem actuator, and separate solenoid means for actuation of each of the servo control valves, including a bridge circuit control means for eliminating the control circuit to one of the solenoid means to its servomotor upon its failure to function.

A further object includes a monitor circuit for detecting the failure and removal of a servo control valve for the tandem actuator from the system in which the servo valve actuating coils are arranged to control a bridge circuit whereby the unbalance of the bridge is detected, amplified and, in turn, operates relay means to remove the electrical inputs to the servo valve which has failed.

Another object is the provision of a dual hydraulic pressure control system whereby the failure of one control valve in one channel and the hydraulic pressure in the other channel drops to zero, which includes means for switching the pressure in the non-failed channel through the non-failed servo control valve, whereby to maintain the system fully operative.

A still further object is the provision of means which permits the operation of the tandem actuator whereby when one servo valve fails, fluid is supplied from two hydraulic sources to the operable servo valve, and when one of the two hydraulic power sources fails, fluid is applied to the operating servo valve that corresponds to the operating hydraulic power source, and when one servo valve fails and the opposite hydraulic power source fails, fluid is cross-fed from the operable hydraulic power source to the operable servo valve and includes means for preventing hydraulic lock in the actuator associated with the failed servo valve or inoperative element of the tandem actuator.

Other objects and advantages of the invention will become apparent from the following description and accompanying drawings in which like reference characters and letters refer to like parts in the several figures.

FIG. 1 is a schematic plan view of a dual channel flight control system having two auxiliary power units and a tandem actuator for a flight attitude control member which is normally simultaneously operable by both channels of the dual system.

FIG. 2 is a primary diagrammatic view illustrating the electrical connections for the servo coils which control the servomotors in the two channels of the system which, in turn, control the tandem actuator for the flight (attitude) control member or members, for instance, of an aircraft.

FIG. 3 is a schematic detail plan view of a dual flight control system employing two separate hydraulic powered systems or channels and a single tandem actuator for the flight attitude control member of an aircraft, showing the same in normal working condition, both channels operative.

FIG. 4 is a diagrammatic wiring layout of the monitor circuit relay, which is actuated by the servo valve or valve monitor circuit shown in FIG. 5.

FIG. 5 is a schematic electrical diagram of the servo valve monitor circuit for actuating the monitor circuit relay to eliminate the monitor circuit, when the solenoid actuators for the servo valves in one of the channels, has failed.

FIG. 6 is a tabulated chart illustrating the number of conditions in the electrical channels involving amplifiers A1 and A2 in the two channels and the associated solenoids S1 and S2 in the same respective channels and the relative current in milliamperes either being delivered or used by the operable item when one of the other electrical items in the system has failed.

FIG. 7 is a tabulated chart illustrating the number and location of failed items in the dual channel system that can still exist in the proposed technique of the invention in which the control system still remains operative. In this chart, S1, A1 and HYD1 denote, respectively, the servomotor, electrical amplifier and the hydraulic power system in one of the channels, while S2, A2 and HYD2 denote the similar items in the other channel of the dual system. It is noted that 26 different conditions of failure can exist and the control system will remian operative for control purposes.

Reference is made to FIG. 1 of the drawings, which is a simple schematic of a dual flight control system having two operating channels indicated as channel 1 and channel 2. Channel 1 includes an auxiliary power unit APU1 and the hydraulic pump indicated as HYD1, which delivers hydraulic working fluid to a servo valve SV1 for controlling the selective delivery of the pressure fluid to the opposite ends of one cylinder 10 of a tandem actuator 11.

The servo valve SV1 is operated in the desired control direction electrically upon signal through an amplifier AMP1, which is supplied from a suitable electrical source 12 although two electrical sources or generators may be employed, if desired, for supplying energy to the amplifiers AMP1 and AMP2.

Channel 2 has similar control items to those in channel 1 in which the separate auxiliary power unit is indicated at APU2 and the hydraulic pump is indicated at HYD2 which delivers hydraulic pressure to the servo valve SV2 for selective delivery to the opposite ends of the second cylinder 13 of the tandem actuator 11 for actuation of a flight attitude control member 14.

The servo valve SV2 (see FIG. 2) is selectively actuated, like the servo valve SV1, by suitable solenoid coils SC1 and SC2 through the amplifier AMP2 connected to suitable electrical signal energizing input means 12, which the servo valve SV1 is selectively actuated by suitable signal control through the amplifier AMP1 in channel 2 of the dual system.

Reference to FIG. 2 will illustrate the normal dual control function of the amplifiers AMP1 and AMP2 wherein it will be observed that a control signal from either one or both of the signal circuits identified as circuits $e^1$ or $e^4$ will energize the two solenoid coils SC1 and SC1' and both servo valves SV1 and SV2 while either one or both of the circuits $e^2$ or $e^3$ will energize either one or both of the solenoid coils SC2 and SC2' for controlling both of the servos SV2 and SV1 which, in turn, control the direction and movement of the flight control actuator member or rod 14.

FIG. 1 illustrates the normal operating condition and, therefore, does not show the interconnecting hydraulic lines (shown in FIG. 3) between the hydraulic pressure sources HYD1 and HYD2 in the two channels, these hydraulic systems being arranged so that under normal operating conditions, fluid from one system or channel will not flow into the second channel or system. However, the fluid from one servo-actuating sub-system or channel enters the second sub-system or channel only when one auxiliary power unit (APU1 or APU2) or one servo valve SV1 or SV2 has failed.

The amplifiers AMP1 and AMP2 are shown in block form in FIG. 1 and FIG. 2 and are assumed to be typical flight control electronic components, that is, they would contain various wave shaping networks and D.C. power outputs to drive the servo valve torque motors (indicated at SC1, SC2 and SC1', SC2'). FIG. 2 illustrates diagrammatically how the electrical outputs of the amplifiers AMP1 and AMP2 could be connected to the torque motor coils SC1, SC2 and SC1' and SC2' for actuation of the solenoid valves SV1 and SV2.

The amplifiers AMP1 and AMP2 are designed so that when the load points A and B (FIGS. 1, 2 and 5) vary or change over a given range, each can deliver the required output, for instance 10 to 40 milliamperes, also the amplifiers are designed for a safe failure; that is, no manual or mechanical switching is necessary to nullify the output.

When two amplifiers AMP1 and AMP2, with the prescribed characteristics, are provided and used to control the two servo valves SV1 and SV2, then the number of fail conditions related to each electronic channel can be considered. The table shown in FIG. 6 indicates that eight different failures of items in the electronic systems involving the two amplifiers AMP1 and AMP2 and the servo valves SV1 and SV2 (solenoid actuators) can occur and the electronic system will maintain its control functions.

The electronic equipment just described, located in the forward portion of the servo actuating control loop has been treated in a somewhat superficial manner and on the black box concept. However, if the servo valves SV1 and SV2 are interchanged automatically, means is provided to detect the failure of a servo valve and then the necessary switching is performed, which is based on electronic principles; but before explaining the technique as devised herein, it is first desirable to consider the hydraulic action and the various types of servo valves which will meet the design requirement with a high degree of reliability.

As shown in the drawings, the servo valve structures SV1 and SV2 are respectively mounted over the dual actuating means or hydraulic cylinders 10 and 13 of a tandem actuator device 11 so that the fluid is manifolded directly to the proper cylinder ports 10' or 10" in cylinder 10, or ports 13' or 13" in the cylinder 13.

As before mentioned, as near as possible, fluid supplied by one hydraulic power source PS2 or PS1 will not enter the other or second hydraulic source PS1 or PS2. In other words, each servo valve SV1 and SV2 will receive, under normal conditions, hydraulic pressure from one designated source. SV1 will receive pressure from pressure supply conduit PS1 while servo valve SV2 will receive pressure from pressure supply conduit PS2. However, if one auxiliary power unit APU1 or APU2 or HYD1 or HYD2 fails, means are provided, as later set forth, to prevent hydraulic lock of the tandem actuator in the cylinder of the tandem actuator normally associated with the failed hydraulic power unit.

Reference is now made to FIG. 3 which schematically shows one arrangement or exemplification of a dual flight control hydraulic system and control items and conduits therein incorporating the invention. The dot and dash line X—X shows how the two systems or channels, indicated as channel 1 and channel 2, are separated hydraulically as completely as possible, and the provision of pressure closed, spring opened bypass valves R2 and R1, respectively, for the cylinders 13 and 10 of the tandem actuator 11 are employed to permit circulation of fluid between the opposite sides of the pistons 13P and 10P to prevent hydraulic lock in case that the hydraulic power source normally operating the pistons in one of the cylinders 13 or 10 fails.

Although not previously mentioned and to present an exemplification of the technique of the invention in simplified form, a conventional feedback or transducer has been purposely omitted. Also, only one dual channel control device is illustrated, such as for controlling aircraft attitude on one axis, for instance, its attitude in pitch, or in roll, or in azimuth. However, the dual system according to the invention may be useful in controlling movement of other members than those associated with aircraft.

While only one type of servo valve SV1 and SV2 is shown in its simplest form for application of a dual control system, one commercial design of valve which could be used satisfactorily is known as "Moog Series 32" valve which is a miniaturized two stage flow control valve, built by Moog Servocontrols, Inc., and utilizes an internal mechanical feedback with high performance over a wide temperature range (−65° to 450° F.) with a delivery of about 10 g.p.m. at 3000 p.s.i. supply pressure. Other commercial servo valves which may be substituted are built by Raymond Atchley Co., Inc., Model 40, and a Model 26 built by Hydraulic Research and Manufacturing Co.

The power output of the dual flight control system is obtained by maintaining the motion of the tandem actuator 11 through the controlling of the hydraulic fluid from the hydraulic power sources HYD1 and HYD2 through the servo valves SV1 and SV2 and then to the desired ends of the respective working cylinders 10 and 13, as seen in FIG. 3. Although the servo valves are shown, for simplicity, as spool sections, other types may be employed, such as the nozzle flapper types such as shown in U.S. Patent 2,995,014 to R. H. Horky, dated August 8, 1961. The invention, as shown, provides means for obtaining the motion of the tandem actuator 14 as follows:

(a) When one of the servomotors SV1 or SV2 fails, fluid is supplied from both of the hydraulic power sources PS1 and PS2 to operate the remaining operable servo valve.

(b) If one of the hydraulic power sources HYD1 or HYD2 fails, pressure fluid from the non-failed hydraulic power source is fed to the operative servo valve which is in the channel containing the operative hydraulic power source.

(c) If one servo valve SV1 or SV2 in one channel fails and the opposite hydraulic power source in the other channel fails, hydraulic pressure fluid is cross-fed from the operable hydraulic power source to the operable servo valve.

(d) When one amplifier or servo valve solenoid in one channel fails this, of course, renders this servo valve inoperative or is equivalent to failure of that servo valve, and means are provided for cutting out the failed electrical actuating circuit for that amplifier.

Reference is now made to FIG. 3, which schematically illustrates a dual (flight attitude) control system according to the subject invention, conditioned for normal operation, all components in both channels 1 and 2 being in operative condition.

In channel 1 hydraulic pressure fluid, for instance from a reservoir 15, is delivered by pump 16 through pressure supply conduit 17 to the intake of a spring closed, pressure operated, control valve R5. Pressure in a bypass conduit 17a from conduit 17 maintains the valve R5 in open position when pressure is in the conduit 17 upstream from the valve R5. The conduit 17a extends from the valve R5, as indicated at 17b, into the other pressure supply channel 2 for normally holding a spring closed pressure operated bypass valve R4 in said other channel 2 open against its spring closing pressure. The pressure conduit 17, as shown, has an upper pair of bypass or lateral conduits 17c and 17d, connected as shown, to a spring balanced triple spool closure valve B4, the conduit 17c being normally closed by the left valve spool of valve B4 while the conduit 17d supplies operating pressure to the right hand end of valve B4 (in channel 1), to balance, or move the valve spool 32 therein to the left.

A further bypass or conduit 17e leads from the main pressure conduit 17 in channel 1 below the valve R5 therein into channel 2, and is connected, as shown, to a second spring and pressure balanced triple spool valve B3, between the center and left hand spool members of the shiftable triple spool valve member 38 therein.

The pressure supply conduit 17 has a further bypass or conduit 17f which connects a spring closed, pressure operated twin spool valve R3 having an opposite outlet conduit 17g adapted to be closed by the spaced dual spools or pistons in a spring and pressure balanced valve B5.

The conduit 17, as shown, extends downwardly and has a final bypass conduit 17h which leads to the center port in the servo valve SV1, this port being normally closed by the center spool of the triple spool valve member 18 therein which is spring balanced and selectively shiftable, for instance by the unbalance of electrcial force in the solenoid coils SC1' and SC2' from the amplified energizing circuits $e^1$ or $e^2$. The pressure supply conduit 17 in channel 1 is finally connected, as shown, to the pressure inlet of a spring opened, pressure closed bypass valve R1, which is opened by spring pressure, when pressure in the conduit 17 fails, to establish communication between the conduits 19 and 20, establishing fluid connection through this bypass valve R1 to the opposite ends of the cylinder 10 of the tandem actuator 11 to prevent hydraulic lock upon failure of pressure in the pressure supply conduit 17.

The conduit 21 is a fluid return conduit (also indicated as PR1), which may connect with the reservoir 15, and normally returns the fluid from one of the other ends of the cylinder 10 under the control of the triple spool valve member 18 in the servo valve SV1.

The other channel 2 of the dual system is quite similar to that just described in connection with channel 1. The pressure supply conduit 22 (also indicated as PS2) receives its pressure through a pump 23 which is supplied with hydraulic fluid from suitable means such as the reservoir 24.

If desired, the quantity of hydraulic fluid in the two reservoirs 15 and 24 may be equalized by any suitable means, for instance by a conduit 25 connected therebetween.

The pressure supply conduit 22 has a first bypass pressure supply conduit 22a which extends into channel 1 and is normally closed by the right hand spool of the triple spool, spring balanced pressure actuated valve member 32 in bypass valve B4, in a similar manner that the bypass conduit 17c (in channel 1) is normally closed by the left hand spool of this triple spool 32 in valve B4.

Proceeding downwardly, as seen in FIG. 3, the next bypass or conduit from pressure supply conduit 22 is a conduit 22b which leads into the left hand end of the balanced pressure operated valve 32 in B4, in the same manner as the bypass conduit 17a connects the right hand end of this same balanced valve B4.

The pressure supply conduit 22 has a bypass conduit 22c therefrom which extends into the inlet or pressure actuating end of a spring closed pressure actuated bypass valve R6, similar to the opposite bypass valve R5 in channel 1.

Both bypass valves R5 and R6 have twin spools, respectively, for interrupting cross-communication in between the conduits 17 and 22 in channels 1 and 2 when the spools or piston valves therein move respectively to the right and left from the positions as shown.

The conduit 22d extends from the valve R6 across into channel 1 and is connected to the pressure inlet end of the aforementioned spring closed pressure opened valve R3 in the same manner as the bypass conduit 17b crosses into channel 2 and connects the pressure intake chamber of the valve R4 in channel 2.

It will now be seen that if either of the valves R5 or R6 close, due to failure of pressure in the bypass conduits 17a or 22c, these valves R5 or R6 will close or tend to close (under spring pressure) and, when closed, these valves will seal off the conduits 17 and 22 downstream below the valves R5 and R6.

The conduit 22, next below the valve R6, has a bypass conduit 22e which connects the balanced triple spool valve B3 between the center and right hand spools thereof when the valve B3 is centered or balanced, as shown.

Next, the pressure supply conduit 22 has a bypass pressure conduit 22f, similar to conduit 17f in channel 1, which is connected, as shown, to the spring closed pressure opened valve R4, from which a continuation conduit 22g, similar to conduit 17g in channel 1, has spaced ports normally closed by the twin spool balanced valve member 41 of the valve B6.

The pressure supply conduit 22 has a bypass or conduit 22h which is ported into the center of servo valve SV2, and is normally closed by the center spool of the twin spool balanced valve member 26 therein in a manner similar to the passage 17h in channel 1.

The pressure supply conduit 22 is finally connected to the pressure inlet chamber of a pressure closed, spring opened bypass valve R2, having the piston valve member 27 therein which normally closes the bypass conduits 28 and 29 between the opposite ends of the cylinder 13 of the tandem actuator 11, for the (flight or attitude) control actuating member 14.

The servo valve SV2, like the servo valve SV1, has a solenoid coil SC1 having an energizing circuit $e^4$ in parallel with a circuit $e^2$ and a solenoid coil SC2 with energizing circuit $e^3$ in parallel with the circuit $e^1$ for the other solenoid SC2' so that normally the electrical energy in both solenoids SC2 and SC2' is increased, or energy in both coils SC1 and SC1' is respectively increased by either one or the other of the amplified signal circuits $e^4$ and $e^2$, or $e^3$ and $e^1$.

When the servo valve members 18 and 26 are balanced, as shown, the outlet or fluid return ports 21a and 21b (in servo SV1) to the return conduit 21, and the fluid return ports 30a and 30b in servo valve SV2 in the fluid return conduit 30 to the reservoirs 15 and 24 respectively are normally closed by the end spools or pistons of the triple spool servo valve members 18 and 26 respectively.

The pressure fluid outlet ports in the first mentioned bypass conduits 22a and 17c are also normally closed by the end spools or pistons of the triple spool valve member 32 in the upper balanced valve B4. A conduit 31, provided with spaced fluid outlet ports 31a and 31b connects the balanced valve triple spool B4 between the center and end spools of the triple spool valve member 32 therein as shown, the conduit 31 extending into both channels 1 and 2 is normally closed in each channel by the normally closed solenoid opened suitable valves 33 and 35, for instance, spring closed plug valves. Valve 33 in channel 1 is actuated by solenoid 34 while solenoid plug valve 35 in channel 2 is actuated by a solenoid 36.

The outlet conduit from solenoid plug valve 33 (V1), indicated at 33a, leads into channel 2 and is connected into the right hand end of the spring closed, pressure opened cutoff valve R6, while the outlet conduit 33b from the soleoid plug valve 35 (V2) in channel 2 extends across into channel 1 and is connected to the left hand end of the other spring closed pressure cutoff valve R5 (in channel 1).

At the center of the conduit 31 a pressure fluid delivery conduit 37 connects the center of the triple spool balanced valve B3 and is normally closed by the center spool of the triple spool or piston valve member 38, therein to be uncovered by shifting of the valve member 38 to the right or left from the position shown.

A similar fluid conduit 42 which is ported in the balanced valve B6 between the twin spools of the valve member 41, extends across into channel 1 and is connected to the balanced twin spool valve B5, to be normally closed or covered by the left hand spool or piston of the twin spool valve member 40 therein.

The right hand ends of the two balanced valves B5 and B6 are connected by a conduit 43, this conduit extending downwardly, as shown at 43a through a check valve C1 (which opens upwardly) and is provided with bypass conduits or lateral passages 43b and 43c, the passage 43b connecting the port 13″ in the tandem actuator 13, and is also ported between the center and left hand end spools of the triple spool valve member 26 of the servo valve SV2.

The lateral passage 43c from 43a is ported into the left hand end of the balanced valve B1, and also ported between the center and left hand spools or pistons of the valve member 44, the passage 43c also being ported into the balanced valve B2 to be normally closed at this point by the left hand spool of the valve member 45 therein.

The conduit 43 has a second downwardly extending passage 43d in channel 1 passing through a check valve C4 (which opens upwardly), with branch passages 43e and 43f, the passage 43e being ported into the balanced valve B2 between the right hand and center spools of the valve member 45 therein and also ported into the right hand end of this balanced valve B2.

The passage 43f is also ported into the balanced valve B1 to be normally closed at this port by the right hand spool of valve member 44 with the valve in balanced condition, the passage 43f being extended at 43g with a port into the servo valve SV1 between right hand and center spools of the servo valve member 18 therein, the passage 43g continuing and finally ported into the right hand end of the tandem actuator cylinder 10 (at 10′).

The left hand ends of the two balanced valves B5 and B6 are connected by a conduit 47 which then continues as noted at 47a and 47b, the conduit or passage 47a passing through a check valve C3 opening upwardly and is connected into the right hand end of the valve B1 and between the right hand and center spools of this valve B1 and has a port which is normally covered by the right hand spool of valve member 45 in the valve B2. The passage 47a extends downwardly through check valve C3 and is ported into tandem actuator at 10″ and into servomotor SV1 between the center and left hand spools of its valve member 18.

The branch conduit 47b, just below the check valve C2 therein, has a passage 47c which is ported into valve B2 between center and left hand spools, this conduit (47b) being also ported into the left hand end of the valve B2, and also ported into the triple spool valve B1 to be normally closed by left hand spool of valve member 44 therein, the passage being further extended as at 47c and ported into the servo SV2 between the center and right pistons or spools thereof with an extension therefrom connecting the port 13′ in the tandem actuator cylinder 13.

During normal operation, the servo valve spools 18 and 26, upon command, by amplified signals energizing the solenoid coils SC2 and SC2′ or SC1 and SC1′ move in the same direction porting fluid to move the tandem actuator 14 in the desired direction. Here, the pressure force is a maximum $2AP_L$, where A is the effective piston area (in both cylinders 10 and 13) and $P_L$ is the pressure differential on opposite sides of pistons 10P and 13P. Also, at this time all of the balanced bypass valves B1, B2, B3, B4, B5 and B6 remain closed or inoperative and the pressure and return lines 17 (PS1), 22 (PS2), and 21 (PR1, 30 (PR2) respectively are connected to their respective systems or channels 1 (HYD1) and 2 (HYD2).

If the spring closed pressure operated valves R1, R2, R3, R4, R5 and R6 are under pressure from supply conduits 17 and 22, valves R5 and R6 open these supply lines 17 and 22 below the valves to admit pressure fluid flow to the servo valves SV1 and SV2. Bypass valves R1 and R2, being pressurized, prevent circulation between the ends of the respective cylinders 10 and 13, and the bypass valves R3 and R4 open the lines or passages 17g and 22g to the twin spool balanced valves B5 and B6.

Thus, the potential interchange between the supply lines 17 and 22 is set up, if required. The solenoid operated plug valves 33 and 35 (V1 and V2) are opened by solenoids 34 and 36 when required to permit flow in the lines 31a or 31b, when operated. The solenoids 34 and 36 are energized by contacts on separate relay means (later described) which, in turn, are selectively energized when a servo valve fails. The valve 33 (V1) is energized by a first relay, when the servo SV1 fails, while the valve 35 is energized by a second relay if the other servo SV2 fails.

*Servo Valve Failure*

When one servo valve, for instance SV1, fails the spool valve 18 therein is held in the center position as shown by the centering springs and the spool valve member 26 in servo valve SV2 will move in the desired direction in response to the applied electrical command signal. Assume that servo SV2 receives signal moving the spool 26 to the right, the pressure port of conduit 22h is uncovered permitting pressure fluid to flow from conduit 22 to the left end of the left cylinder 13 of the tandem actuator 11 and thus drive the piston 13P to the right. Simultaneously with this action, pressure is applied to the left end of bypass valve B1 through passages 43b and 43c thus moving the spool 44 of B1 to the right. In so doing, the valve port at the right hand spool end of B1 is uncovered which permits fluid otherwise trapped in the right hand end of cylinder 10 of tandem actuator 11 to circulate back through port 10′, and thus prevent hydraulic lock. Also, with the preceding action, fluid flows through check valve C1 and thence to the right hand ends of bypass valves B5 and B6 through passages 43a and 43 moving the valve spools 40 and 41 to the left, uncovering the valve ports from passages 22g and 17g, thus permitting pressure PS1 to be connected through 22g to PS2 pressure. In this manner, the load is divided between pressure in supply conduits 17 and 22 (HYD1 and HYD2) thereby power, which would otherwise be lost is conserved or utilized during the failure of one of the servo valves, for instance SV1.

*Hydraulic Power Failure*

Next, assuming pressure supply in one of the channels for instance a hydraulic pump fails, for instance the pump 23. The pressure in conduit 22 (HYD2) thus drops to zero. Although the servo motor SV2 has not failed, it will not be operable with pressure PS2 in conduit 22 at zero, inasmuch as this type of servo control valve utilizes opposing hydraulic power to position the piston 13P in the cylinder 13. Therefore, only servo valve SV1 operates with HYD1 and the following action takes place: Bypass valve member 27 in R2 moves to the left by spring pressure and lack of pressure in conduit 22, which permits fluid in the left cylinder 13 of tandem actuator 11 to circulate between its ends. Balanced valve R3 operates to close interconnecting arrangement between conduits 22 and 17 (PS1 and PS2). Bypass valve B4 is unbalanced and the spool 32 therein moves to the left, which uncovers valve port from conduit 17c to permit pressure from conduit 17 (PS1) to pass through passage 17c to enter the center port 37 in balanced valve B3. Bypass valve B3 is now in readiness state until such time as a servo valve failure occurs, and if this occurs, spool 38 of valve B3 moves in the desired direction, caused by the energizing of the proper solenoid valve V1 or V2 to port supply pressure to the operable servo valve SV1 or SV2. Therefore, it will be observed that if one HYD fails and only the corresponding servo valve operates, the force output of the tandem actuator 11 is $AP_2$ or one-half of its maximum output under normal conditions.

*Failure of One Servo Valve and One Hydraulic Pump*

If one servo valve, for instance SV1, in channel 1 and one hydraulic system, for instance HYD2 in channel 2 both fail, actuation of the tandem actuator 11 is still maintained by operation of the valving arrangement contemplated, as follows: Since servo valve SV1 has failed, solenoid valve 33 (V1) is energized by coil 34 permitting pressure fluid from bypass valve B4 to move spool valve 32 in valve B4 to the left. Also pressurized fluid through conduit 33a, plus the spring pressure in bypass valve R6 closes the same to prevent pressure (PS1) in conduit 17 from flowing into conduit 22.

In consequence of HYD2 having failed, pressure has been removed from bypass valve R3, passage 22d being closed by spring closed bypass valve R6, prevents the intercommunicating arrangement from operating. In other words, fluid from one system or channel cannot now enter the other system or channel by way of the interconnecting arrangement of bypass valve R3, balanced valves B5, B6 and bypass valve R4.

Normally, if pressure system (HYD2) failed, valve R2 would have operated and allowed fluid in the left section 13 of tandem actuator 11 to circulate. However, once pressure in the line 22 has been restored, the bypass valve R2 closes the connecting line between the ends of the cylinder 13. Now, for the operation of the bypass valve B4, the pressure PS1 in conduit 17 forces the spool 32 of bypass valve B4 to the left, which admits fluid at the center port 37 of balanced valve B3.

As previously stated, the plug valve 33 (V1) when energized permits fluid pressure to move the spool 38 of valve B3 to the left, which uncovers the central port 37 and pressure fluid then enters the conduit 22 (PS2) through conduit 22e below the bypass valve R6.

Thus, when signals are applied to servo valve SV2, the balanced valves B1 and B2 will operate in the same manner as previously described relating to the servo valve failure.

It should be noted (in FIG. 3) that when each channel includes a separate fluid reservoir such as 15 and 24, a bypass conduit such as 25 may be provided for equalizing the returned fluid which is transferred from one channel to the other due to the pump or servo failure in one of the channels. Of course, if a common reservoir is used there would be no fluid transfer problem.

*Servo Valve Monitor Circuit*

The invention also contemplates the provision of means for detection of a servo valve failure and the automatic removal of the failed servo valve (energizing circuit) from the system. This is accomplished by a servo valve monitor circuit or circuits, one circuit being schematically illustrated in FIG. 5 (in connection with FIG. 4), coil connections in FIG. 5 differing slightly from those shown in FIG. 2. FIG. 2 shows only the general arrangement of the connections while FIG. 5 shows the circuit and connections more in detail, namely, the addition of electrical resistors R1, between "a" and "A," and R2 and between "B" and "c." The resistors R1 and R2 are comparatively small as compared to the solenoid energizing coils SC1 and SC2, hence, the coil currents are practically the same with or without the resistors R1 and R2 in the circuit.

A monitor circuit substantially identical to that shown in FIG. 5 would also be used in connection with servo SV2, FIG. 5 being the monitor circuit for servo SV1.

Points W, X, Y and Z on the circuit with SV1 (FIG. 4) designate or lead to the contacts on the relay 2 for the corresponding monitor circuits for servo SV2; thus, if one servo valve (circuit) fails, the continuance of the monitoring of the other servo valve is no longer necessary. Also, any failure in the second monitoring circuit that could inadvertently cause the second relay to operate, is thus prevented.

The voltages represented as $e^1$ and $e^2$ (see FIG. 5) are equal when no signal is applied to the inputs of amplifiers AMP1 and AMP2 (FIG. 1). Also, the potential drop across $ab$ and R4 (FIG. 5) are equal, also the potential drop across $cb$ and R3 are equal. Since resistances R5, R6, R7 and R8 in FIG. 5 are equal resistances, the grids of tubes 1 and 2 have the same potential. Consequently, the output across transformer T1 is zero.

When a signal is applied to servo SV1 so that $e^1$ is greater than $e^2$, the tube 1 will conduct; however, tube 2 will also conduct (in opposition or 180° out of phase) and the net action across transformer T1 will be zero.

Also, if a control signal is applied so that $e^1$ is less than $e^2$, the tube 1 conducts and the tube 2 also conducts (in opposition or 180° out of phase) and the net output of transformer T1 is still zero.

Now, assuming that coil SC1 of solenoid SV1 develops a short and therefore no signal is applied, $e^1$ and $e^2$ are the same, but the voltage drop across $ab$ no longer equals the voltage drop across $bc$ or R4. Therefore, tube 1 will conduct, but tube 2 will not conduct, and therefore a voltage output, filtered by the filters R9 and C1 occurs to energize the relay 1. This relay 1 (FIG. 4) will close, which removes the failed servo electrical system in channel 1 for servo valve SV1 in channel 1, while the other servo valve system SV2 in channel 2 remains operative.

After the monitor relay 1 has operated, a mechanical lock (as schematically shown in FIG. 4), maintains the armature in the locked position, removing the monitoring systems, as further action of the monitoring systems is unnecessary and is eliminated.

A similar monitoring system, as previously mentioned, is provided for the electrical system of servo SV2 in channel 2. Failure of the electrical output in channel 2 for controlling the servo SV2 energizes a relay (like relay in FIG. 4) and the energizing thereof similarly removes the monitoring circuit for channel 2.

It should be noted that when the relay 1 (FIG. 5) is energized, the circuit to the solenoid coil 34 of (plug) valve 33 is energized opening the passage 33a (FIG. 3). The energizing of the similar relay in the other channel will cause its contacts to energize the solenoid 36 in the other channel for the other (plug) valve 35 to cause the same to open, so that failure of pressure in either fluid pressure system HYD1 or HYD2 will shift the balanced valve B4 to establish fluid pressure from the nonfailed pressure system through the balanced valve B3 into the pressure conduits associated with the failed system, but below the respective bypass or cutoff valves R5 or R6, these valves being selectively closed by pressure in one or the other of the conduits 33a or 33b under the above conditions, when one or the other of the solenoid actuated valves 33 or 35 is opened by the closing of the respective relays, such as shown in FIG. 4 in the two channels as above set forth, under selective control of the monitoring systems in the two channels.

As tabulated in FIG. 7, it will be observed that the number of failed conditions that are possible and still permit operation of the dual system, according to the invention are twenty-six various conditions under which a failure or failures of different items in the two channels can be tolerated with the monitoring system of the subject invention as compared to six without the monitoring and servo-actuated design.

Although one embodiment of the invention has been illustrated and described in detail, for purposes of exemplification, it is understood that the invention is not limited thereto, as various changes can be made in the design and arrangement of the parts by those skilled in the art without departing from the spirit and scope of the invention as defined by the following claims.

I claim:

1. In a dual channel hydraulic pressure actuated control system, a tandem actuator having separate pressure chambers, and pressure actuated means in said chambers connected for simultaneous control movements of a common control member, separate hydraulic pressure supply conduit means in each channel, separate servo-motor means in each channel connected to the pressure supply conduit means in that channel for controlling the movement of said pressure actuated means in that channel, solenoid actuator means in each channel, means connected between said pressure supply conduits responsive to failure of one of said servo motor means, for bypassing pressure fluid in the pressure chamber controlled by said failed servo-motor means to prevent hydraulic fluid lock therein, and simultaneously connecting said hydraulic pressure supply conduit in that channel to the hydraulic pressure supply conduit in the other channel.

2. In a dual channel hydraulic pressure actuated control system, a tandem pressure operated actuator having a separate pressure cylinder in each channel and a pressure actuated piston in each cylinder, a common actuator member connected to said pistons for simultaneous actuation thereof, servo-motor means in each channel connected to the cylinder in that channel for controlling the direction of movement of the piston therein, solenoid means in each channel connected to servo-motor means in that channel for selective actuation thereof, a pressure supply conduit in each channel connected to said servo-motor means in that channel for normally supplying pressure fluid to the cylinder in that channel under control of said servo-motor means therein, and pressure fluid transfer means between said pressure supply conduits in both of said channels including means responsive to failure of operation of the servo-motor means in one channel for bypassing trapped pressure fluid between the opposite ends of the cylinder which is connected to the failed servo-motor means to eliminate fluid lock in the tandem actuator cylinder last mentioned, and valve and fluid transfer conduit means between said pressure conduits in said two channels responsive to failure of operation of a servo-motor means in one channel for connecting said pressure conduit in that channel to the pressure supply conduit in the other channel, for supplying pressure from both pressure supply conduits to the servo-motor means which remains operative.

3. In a dual channel hydraulic pressure actuated control system, a tandem actuator having separate pressure cylinders, one in each channel, a pressure actuated piston in each cylinder, a common actuator member connected to said pistons for simultaneous actuation thereof by said pistons, servo-motor valve means in each channel connected to the cylinder in that channel for selectively admitting fluid pressure to the opposite sides of the piston therein, solenoid actuator means in each channel for actuating said servo-motor valve means including separate solenoid energizing circuits in each channel for energizing the solenoid actuator means therein, bridge circuit and amplifier means therefor in each channel connected across said separate solenoid energizing circuits in that channel, each bridge circuit having a zero output when said separate solenoid energizing circuits in that channel are balanced, relay means in each channel connected to be energized by the bridge circuit in that channel and amplifier means for operation upon unbalance of the bridge circuit therein, means for locking said relay means in its energized position following the energizing thereof, contact means normally closed by the relay means in each channel for interrupting the electrical output in the bridge circuit in the other channel when the relay means is energized, separate fluid pressure supply conduit means in each channel connected for supplying pressure fluid to the pressure cylinder in that channel under control of the servo-motor control means in that channel, and means responsive to failure of operation of said servo-motor means in one channel for bypassing pressure fluid between the opposite ends of the pressure cylinder in that channel.

4. In a dual channel hydraulic pressure actuated control system, a tandem actuator having spaced pressure cylinders, one for each channel, pressure actuated piston means in each cylinder, common actuator means connected to said piston means for simultaneous actuation thereof by said piston means, servo valve means in each channel connected for admitting pressure fluid into the opposite ends of the pressure cylinder in that channel for controlling the movement of the piston means therein, solenoid actuator means in each channel for controlling the adjustment of said servo-valve means in that channel, separate pressure supply conduits, one in each channel, connected to the servo-valve means in that channel, and pressure operated valve and conduit means connected between said channels, responsive to failure of pressure in one of said pressure supply conduits and failure of one of said servo-valve means in the other conduit for automatically closing the failed pressure supply conduit to the servo valve means in that channel, connecting the hydraulic pressure supply conduit in the other channel to the servo-valve means in the failed hydraulic pressure supply conduit for supplying hydraulic pressure thereto including pressure operated bypass means responsive to the aforesaid failure of said servo valve means in the non-failed hydraulic pressure supply conduit for interrupting pressure from the nonfailed pressure supply conduit to the failed servo valve means and simultaneously connecting the opposite ends of the cylinder controlled by the failed servo valve means, to prevent hydraulic pressure lock therein.

5. In a dual channel flight control system, a tandem actuator having separate hydraulic pressure cylinders, one for each channel, piston means movable in each cylinder, a common flight control member connected to said pistons for actuation thereof by one or both of said pistons, separate servo valve means for each cylinder for selectively controlling the admission of a hydraulic pressure fluid into the opposite ends of that cylinder for controlling the movement of said common flight control member, hydraulic pressure supply and return conduit means in each channel connected through said servo valve means in that channel to the cylinder controlled by that servo valve means, solenoid actuator means in each channel including opposing energizing circuit means in that channel for energizing said solenoid actuator means therein, bypass conduit means connected between the opposite ends of the cylinder in each channel, pressure closed valve means in said bypass conduit means, and means connected between said pressure supply conduit means and said pressure closed valve means in that channel, responsive to pressure therein for holding said pressure closed valve means closed, bridge circuit control means connected in each channel between said opposing energizing circuits for the solenoid actuator means in that channel, relay means in each channel responsive to unbalance of the bridge circuit in that channel for opening the circuit to said solenoid actuator means in that channel upon electrical failure therein, means responsive to actuation of said relay means for closing the pressure supply conduit to said servo valve means in that channel, interrupting the bridge circuit in the other channel, and connecting the opposite ends of the cylinder in that channel for establishing fluid communication between the opposite sides of the piston in that cyinder to eliminate hydraulic lock therein.

6. In a dual channel hydraulic pressure fluid control system, a hydraulic pressure actuated tandem actuator having separate pressure cylinders, a pressure actuated piston member in each cylinder connected to a common control member for simultaneous controlling movement thereof, separate servo motor control means in each channel for individually controlling the movement of each piston member in each of said cylinders, separate hydraulic pressure supply conduit means, one in each channel connected to the servo motor control means in that channel for supplying hydraulic pressure to the servo motor control means in that channel, spring closed pressure opened bypass valve means in each of said hydraulic pressure supply conduit means for closing that pressure supply conduit means downstream from said spring closed pressure opened valve means therein including bypass pressure conduit means connected to said spring closed pressure opened bypass valve means and to said pressure supply conduit means upstream from the last-mentioned valve means for maintaining that pressure supply conduit means open incident to pressure therein, interconnecting bypass conduit means connected between the opposite ends of each of said cylinders, spring opened pressure closed valve means therein intermediate the ends of the last-mentioned interconnecting bypass conduit, in each of said channels, including pressure supply conduit means connected to said spring opened pressure closed valve means in that channel and to the hydraulic pressure supply conduit means in that channel for closing said interconnecting bypass conduit when pressure is present in said hydraulic pressure supply conduit means in that channel, and opening the same upon failure of pressure therein, pressure balanced valve and conduit means connected between the hydraulic pressure supply conduit means in the two channels operable upon failure of pressure in one of said hydraulic pressure supply conduits in one channel and failure of said servo motor means in the other channel for cross feeding the hydraulic pressure in the nonfailed pressure supply conduit means below the spring closed, pressure opened bypass valve therein into the failed hydraulic pressure supply conduit means downstream the said spring closed, pressure opened valve therein and upstream from the operable servo valve means therein, and means responsive thereto for bypassing pressure fluid between the opposite ends of the cylinder controlled by said failed servo motor means for eliminating hydraulic lock therein.

7. In a dual channel flight attitude control system as set forth in claim 6, including servo actuator means in each channel for controlling said servo motor means in that channel, including separate servo motor solenoid energizing circuits therefor and a common energizing circuit for simultaneously energizing both of the aforesaid circuits for simultaneously controlling the operation of said servo motor means in both of said channels.

8. In a dual channel flight attitude control system as claimed in claim 7, a monitor bridge circuit in each channel connected across said servo motor solenoid energizing circuits in that channel responsive to unbalance of the bridge circuit in that channel for producing an energizing signal, relay means energized by said bridge circuit in that channel responsive to said energizing signal therefrom, including separable contact means for interrupting said servo motor solenoid energizing circuits in that channel, when said relay means is energized, additional contact and circuit means normally closed by the relay means in each channel for disconnecting both of said bridge circuits when either of said relay means is energized, and mechanical lock means in each channel for locking said relay means in that channel in its energized position, following the energization thereof by its energizing bridge circuits.

9. In a dual channel fluid operated flight control system, a fluid pressure operated tandem actuator having separate pressurized cylinders and a pressure actuated piston member in each cylinder, a control member connected to said piston members to be actuated thereby, adapted to be connected to a flight control member for actuation thereof, servo valve means connected to each of said cylinders for controlling the movement of said pistons therein, separate hydraulic supply and return conduits in each channel for separately supplying and returning pressure fluid to and from the cylinder in that channel under control of said servo valve means in that channel, solenoid actuator means in each channel for controlling movement of said servo valve means in that channel, pressure opened, spring closed bypass valve means in each of said pressure supply conduits for closing that conduit downstream from the last-mentioned valve means upon pressure failure in said pressure supply conduit in that channel, balanced valve and connected conduit means between said pressure supply conduit means downstream from said pressure opened, spring closed valve means in said conduit means, responsive to failure of pressure in one of said pressure supply conduits and failure of said solenoid actuator means in the other channel for bypassing the pressure fluid from the nonfailed pressure supply conduit into the other pressure supply conduit between the servo valve means therein controlled by the failed solenoid actuator means and pressure opened spring closed bypass valve means, for controlling the operation of said tandem actuator upon failure of one servo valve means in one channel and failure of pressure in the pressure supply conduit in the other channel, and bypass conduit and valve means in each channel between the opposite ends of the cylinder therein for bypassing fluid trapped therein around the piston therein responsive to failure of pressure in the pressure supply conduit in the channel containing the failed servo valve means.

10. In a dual channel hydraulic pressure actuated flight control system, a fluid pressure operated tandem actuator having pressure cylinders and pressure actuated piston means therein, in each channel, a control member common to said piston means to be simultaneously actuated thereby, adapted to be connected to a flight attitude control means for actuation thereof, servo valve means in each channel for controlling the actuation of the piston means in the cylinder in that channel, an auxiliary power unit in each channel comprising hydraulic pressure supply means and pressure conduit means connected to the servo valve means in that channel for supplying hydraulic pressure therefrom into said cylinder in that channel for adjusting said flight attitude control member, solenoid control means for each servo valve means for selective control adjustments thereof, separate opposing energizing circuits in each channel for selectively energizing said solenoid control means, a monitor circuit in each channel for monitoring said opposing energizing circuits in that channel including a connected bridge circuit and amplifier means having a zero electrical output when said bridge circuit is balanced, relay means energized by said bridge circuit when the same is unbalanced due to failure of current in one of said energizing circuits in that channel, circuit breaking means operable by said relay means when energized for breaking said opposing energizing circuit for said solenoid control means in that channel and interrupting said monitor circuits in both channels, conduit and valve means operable by said relay means, when energized by unbalance of said bridge circuit, for bypassing pressure fluid between the opposite sides of the piston means in the pressure cylinder associated with the solenoid control means normally under control of said de-energized opposing energizing circuits, for preventing hydraulic lock of said control member.

11. Apparatus as set forth in claim 10 including mechanical lock means for locking each of said relay means in its energized position, when energized by its energizing bridge circuit.

12. In a dual channel hydraulic pressure control system, separate hydraulic pressure supply conduit means in each channel, a tandem actuator common to both channels having a pressure cylinder in each channel, piston means in each cylinder, a common actuator member connected to both piston means for simultaneous actuation thereof, servo valve means in each channel connected to the conduit means in that channel for controlling the admission of pressure from that conduit means into the opposite ends of the cylinder in that channel for controlling the adjustment of said actuator member, solenoid actuated means in each channel for selective actuation of said servo valve means in that channel, normally closed pressure fluid transfer means between said pressure fluid conduit means in both channels responsive to failure of pressure in said pressure fluid conduit means in one of said channels and failure of said servo valve means in the other channel for supplying pressure fluid from the pressure supply conduit in said other channel to the servo valve means in said one channel, and means responsive to failure of the aforesaid servo valve means for bypassing pressure fluid between the opposite sides of the piston means in that cylinder for preventing fluid pressure lock therein.

13. In a hydraulic pressure fluid dual channel flight control system, separate hydraulic pressure fluid supply conduits, one in each channel, means for supplying hydraulic pressure fluid into said conduits, separate pressure cylinders, one in each channel connected to the fluid pressure supply conduit in that channel, a common actuator member adapted to be connected to a flight control member for actuation thereof, a piston member in each of said cylinders connected to said common actuator member, separate servo control means in each channel connected between the pressure supply conduit and the pressure cylinder in that channel for controlling the delivery of pressure fluid into the opposite ends of the cylinder in that channel for adjustment of said common actuator member, pressure closed spring opened bypass valve and conduit means connected between the opposite ends of the cylinder in that channel for bypassing pressure fluid between said opposite ends of that cylinder when said bypass valve is open, including a conduit connected between said supply conduit and said bypass valve in that channel for holding said bypass valve closed incident to pressure in said fluid supply conduit, whereby failure of pressure in said fluid supply conduit permits said bypass valve to open for establishing a fluid bypass connection between the opposite ends of the cylinder in that channel, to prevent fluid lock therein, opposing energizing circuits in each channel including solenoid actuator means in that channel for selectively actuating said servo means, a monitor bridge circuit in each channel connected to said opposing bridge circuits including relay means in each channel energized by unbalanced of said bridge circuit in that channel for interrupting said opposing energy circuits in that channel and removing the bridge circuit control in the other channel, including solenoid operated valve and conduit means operable by said relay means for bypassing pressure fluid between the opposite ends of the cylinder in the channel containing the unbalanced bridge circuit, independently the first-mentioned bypass conduit and pressure closed valve means, and solenoid valve and conduit means between said channels and said fluid supply conduits operable under control of said relay means for bypassing pressure fluid from the supply conduit in the channel containing the unbalanced bridge circuit into the supply conduit in the other channel, whereby pressure in both supply conduits is connected to the supply conduit in the channel containing the operable servo valve.

14. In a dual channel flight control system, pressure fluid supply and return conduits in each channel, tandem pressure operated flight control means including a pressure actuated member in each channel connected to the supply and return conduits in that channel, a servo valve in each channel for controlling the pressure fluid and return thereof from said supply and return conduits, solenoid actuator means in each channel for controlling the movement of said servo valve therein including opposing amplified energizing circuits therefor in each channel for controlling movement of said solenoid actuator means for said servo valve in that channel, a common energizing signal circuit for simultaneously energizing said opposing amplifiers energizing circuits in both channels, a monitor circuit in each channel for said opposing energizing circuits in that channel including a bridge circuit connected across said opposing energizing circuits, and relay means in each channel operable by said monitor circuit therein upon unbalance of its bridge circuit for interrupting the monitor control circuit in the other channel, interrupting the circuit in its channel between said opposing energizing circuits therein and said solenoid actuator means therein, and fluid transfer means between said channels including solenoid valve means therein operable by said relay means, for bypassing pressure fluid from the pressure fluid supply conduit in that channel when said relay therein is energized, to the pressure fluid supply conduit in the other channel.

15. Apparatus as claimed in claim 14 including fluid pressure responsive means connected between said pressure fluid supply conduits for actuation thereof upon failure of said servo valve energizing circuits in one channel and failure of pressure in the other channel for bypassing the pressure fluid from the operative pressure fluid supply conduit in the channel containing the failed servo valve energizing circuits into the pressure fluid supply conduit in which the pressure therein has failed, and means for bypassing pressure fluid around the pressure actuated member in the aforesaid channel containing the failed servo valve energizing circuits to eliminate fluid lock therein.

References Cited in the file of this patent
UNITED STATES PATENTS

| | | |
|---|---|---|
| 2,877,742 | Richolt et al. | Mar. 17, 1959 |
| 2,921,562 | Westbury et al. | Jan. 19, 1960 |
| 2,956,408 | Fowler | Oct. 18, 1960 |